United States Patent
Schnetzka

(10) Patent No.: US 8,004,803 B2
(45) Date of Patent: Aug. 23, 2011

(54) VARIABLE SPEED DRIVE

(75) Inventor: Harold R. Schnetzka, York, PA (US)

(73) Assignee: Johnson Controls Technology Company, Holland, MI (US)

(*) Notice: Subject to any disclaimer, the term of this patent is extended or adjusted under 35 U.S.C. 154(b) by 433 days.

(21) Appl. No.: 12/281,803

(22) PCT Filed: Apr. 17, 2008

(86) PCT No.: PCT/US2008/060612
§ 371 (c)(1),
(2), (4) Date: Sep. 5, 2008

(87) PCT Pub. No.: WO2008/137276
PCT Pub. Date: Nov. 13, 2008

(65) Prior Publication Data
US 2010/0229580 A1 Sep. 16, 2010

Related U.S. Application Data

(60) Provisional application No. 60/916,674, filed on May 8, 2007.

(51) Int. Cl.
*H02H 3/00* (2006.01)
(52) U.S. Cl. ............... 361/42; 361/1; 361/31; 324/509; 324/508; 324/541; 324/544; 324/551; 318/563
(58) Field of Classification Search ............... 361/42, 361/44–50, 1, 31, 118, 111, 117; 363/34, 363/37, 44, 47, 48; 318/459, 800, 563; 62/228.1, 62/228.4; 700/79–82; 714/1; 324/509, 508, 324/541, 544, 551; 307/326; 323/267; 340/635, 340/649, 650, 652
See application file for complete search history.

(56) References Cited

U.S. PATENT DOCUMENTS 3,593,103 A 7/1971 Chandler et al.
(Continued)

FOREIGN PATENT DOCUMENTS

EP 0272776 A2 6/1988
(Continued)

OTHER PUBLICATIONS

Annabelle Van Zyl, Rene Spee, Alex Faveluke, and Shibashis Bhowmik; Voltange Sag Ride-Through for Adjustable-Speed Drives With Active Rectifiers; Nov./Dec. 1998; vol. 34, Issue No. 6; IEEE Transactions on Industry Applications.

(Continued)

*Primary Examiner* — Rita Leykin
(74) *Attorney, Agent, or Firm* — McNees Wallace & Nurick LLC

(57) ABSTRACT

Systems and methods for improved Variable Speed Drives are provided. One embodiment relates to apparatus for common mode and differential mode filtering for motor or compressor bearing protection when operating with Variable Speed Drives, including conducted EMI/RFI input power mains mitigation. Another embodiment relates to a method to extend the synchronous operation of an active converter to the AC mains voltage during complete line dropout. Another embodiment relates to an active converter-based Variable Speed Drive system with Improved Full Speed Efficiency. Another embodiment relates to a liquid- or refrigerant-cooled inductor. The liquid- or refrigerant-cooled inductor may be used in any application where liquid or refrigerant cooling is available and a reduction in size and weight of a magnetic component is desired.

16 Claims, 5 Drawing Sheets

U.S. PATENT DOCUMENTS

| | | | |
|---|---|---|---|
| 4,308,491 A | | 12/1981 | Joyner, Jr. et al. |
| 4,587,474 A | | 5/1986 | Espelage et al. |
| 4,758,771 A | | 7/1988 | Saito et al. |
| 5,081,368 A | | 1/1992 | West |
| 5,123,080 A | * | 6/1992 | Gillett et al. ............... 388/811 |
| 5,127,085 A | | 6/1992 | Becker et al. |
| 5,298,848 A | | 3/1994 | Ueda et al. |
| 5,410,230 A | | 4/1995 | Bessler et al. |
| 5,592,058 A | | 1/1997 | Archer et al. |
| 5,625,548 A | * | 4/1997 | Gold et al. ................. 363/98 |
| 5,646,458 A | | 7/1997 | Bowyer et al. |
| 5,726,873 A | * | 3/1998 | Gold et al. ................. 363/98 |
| 5,747,955 A | | 5/1998 | Rotunda et al. |
| 5,796,234 A | | 8/1998 | Vrionis |
| 5,869,946 A | | 2/1999 | Carobolante |
| 5,936,855 A | | 8/1999 | Salmon |
| 5,953,224 A | * | 9/1999 | Gold et al. ................. 363/98 |
| 5,969,966 A | | 10/1999 | Sawa et al. |
| 6,005,362 A | | 12/1999 | Enjeti et al. |
| 6,072,302 A | | 6/2000 | Underwood et al. |
| 6,118,676 A | | 9/2000 | Divan et al. |
| 6,160,722 A | | 12/2000 | Thommes et al. |
| 6,163,472 A | | 12/2000 | Colby |
| 6,239,513 B1 | | 5/2001 | Dean et al. |
| 6,276,148 B1 | | 8/2001 | Shaw |
| 6,313,600 B1 | | 11/2001 | Hammond et al. |
| 6,348,775 B1 | | 2/2002 | Edelson et al. |
| 6,411,529 B1 | * | 6/2002 | Svensson ................... 363/35 |
| 6,487,096 B1 | | 11/2002 | Gilbreth et al. |
| 6,559,562 B1 | | 5/2003 | Rostron |
| 6,608,452 B1 | * | 8/2003 | Holmes .................. 315/307 |
| 6,686,702 B1 | * | 2/2004 | Holmes .................. 315/247 |
| 6,686,718 B2 | | 2/2004 | Jadric et al. |
| 6,768,284 B2 | | 7/2004 | Lee et al. |
| 6,801,019 B2 | | 10/2004 | Haydock et al. |
| 7,081,734 B1 | * | 7/2006 | Jadric et al. ............... 318/801 |
| 7,358,625 B2 | * | 4/2008 | Cheng et al. .............. 307/18 |
| 7,555,912 B2 | * | 7/2009 | Schnetzka et al. ........ 62/228.4 |
| 7,619,906 B2 | * | 11/2009 | Schnetzka ................. 363/34 |
| 2003/0015873 A1 | | 1/2003 | Khalizadeh et al. |
| 2003/0052544 A1 | | 3/2003 | Yamamoto et al. |
| 2005/0068001 A1 | | 3/2005 | Skaug et al. |
| 2005/0099743 A1 | * | 5/2005 | Lee ........................ 361/42 |
| 2007/0063668 A1 | | 3/2007 | Schnetzka et al. |
| 2007/0151272 A1 | * | 7/2007 | Cosan et al. .............. 62/228.1 |
| 2010/0079093 A1 | * | 4/2010 | Kitanaka ................... 318/400.3 |

FOREIGN PATENT DOCUMENTS

| | | |
|---|---|---|
| EP | 0283954 A2 | 9/1988 |
| EP | 0313366 A2 | 4/1989 |
| EP | 0422221 A1 | 11/1989 |
| EP | 0571657 A2 | 1/1993 |
| EP | 1122849 A2 | 8/2001 |
| WO | 9314559 A1 | 7/1993 |
| WO | 9732168 A1 | 9/1997 |
| WO | 2006093647 A1 | 9/2006 |

OTHER PUBLICATIONS

Annette Von Jouanne, Prasad N. Enjeti, and Basudeb Banerjee; Assessment of Ride-Through Alternatives for Adjustable-Speed Drives; Jul./Aug. 1999; vol. 35, Issue No. 4; IEEE Transactions on Industry Applications.

Christian Klumpner and Frede Blaabjerg; Using Reverse Blocking IGBTs in Power Converters for Adjustable Speed Drives; 0-780307883-0/03 2003; Aalborg University, Institute of Energy Technology.

* cited by examiner

VARIABLE SPEED DRIVE

CROSS REFERENCES TO RELATED APPLICATIONS

This patent application claims the benefit of U.S. Provisional Patent Application No. 60/916,674, entitled VARIABLE SPEED DRIVE SYSTEMS AND METHODS, filed May 8, 2007, for which priority is claimed and the disclosure of which is hereby incorporated by reference.

BACKGROUND

The present application relates generally to variable speed drives. The application relates more specifically to systems and methods in variable speed drives having active converters with integral ground fault protection.

A variable speed drive (VSD) for heating, ventilation, air-conditioning and refrigeration (HVAC&R) applications may include a rectifier or converter, a DC link, and an inverter. Ground fault protection within a VSD can be implemented in various ways. One such method utilizes an external ground fault sensor (a single "zero sequence" current transformer and detection circuitry) that opens a set of relay contacts. The relay contacts may be connected to a shunt-trip device within a circuit breaker that opens the circuit breaker when energized. The circuit breaker is placed at the input power terminals of the VSD. Another ground fault protection method utilizes a molded case circuit breaker with a trip unit that incorporates a ground fault detection circuit. These units typically have a higher level of ground fault current trip as they typically utilize three current sensors, one per phase on a three-phase system, and sum the outputs to effectively sense the zero sequence/ground fault current. The integrated circuit breaker units are much more compact than earlier ground fault circuit breakers. However the level at which the ground fault current trip can be sensed is greater, and the accuracy of the sensed ground fault current is reduced, as a result of the three phase sensors. Another ground fault protection method utilizes motor current sensing means to shut down the inverter section of the VSD. This method fails to provide ground fault protection in the event of a ground fault occurring internally in the VSD. This method also fails to provide ground fault protection when there is a low impedance earth-referenced power feed and a ground fault occurs at the output of the VSD.

SUMMARY

One embodiment of the present invention relates to a variable speed drive system configured to receive an input AC voltage at a fixed AC input voltage and provide an output AC power at a variable voltage and variable frequency. The variable speed drive includes a converter stage connected to an AC power source providing the input AC voltage, the converter stage being configured to convert the input AC voltage to a boosted DC voltage; a DC link connected to the converter stage, the DC link being configured to filter and store the boosted DC voltage from the converter stage; and an inverter stage connected to the DC link, the inverter stage being configured to convert the boosted DC voltage from the DC link into the output AC power having the variable voltage and the variable frequency. The variable speed drive also includes a ground fault protection system for interrupting fault current flowing to an input phase of the active converter, the ground fault protection system including at least one current sensor for sensing a ground fault on an input phase of the active converter, and a controller; wherein the active converter further includes at least two semiconductor switches for each power phase of the AC power source; each of the at least two semiconductor switches comprising a pair of reverse blocking IGBTs inversely connected in parallel, wherein each of the reverse blocking IGBTs is controllable by the controller to switch the RB IGBTs to a nonconductive state in response to a sensed ground fault current.

Another embodiment of the present invention relates to a ground fault protection system in an active converter for instantaneously interrupting a ground fault at an input phase of the active converter, using reverse blocking IGBTs in antiparallel to controllably switch off fault current in response to a sensed fault.

DETAILED DESCRIPTION OF THE EXEMPLARY EMBODIMENTS

Figure 1:
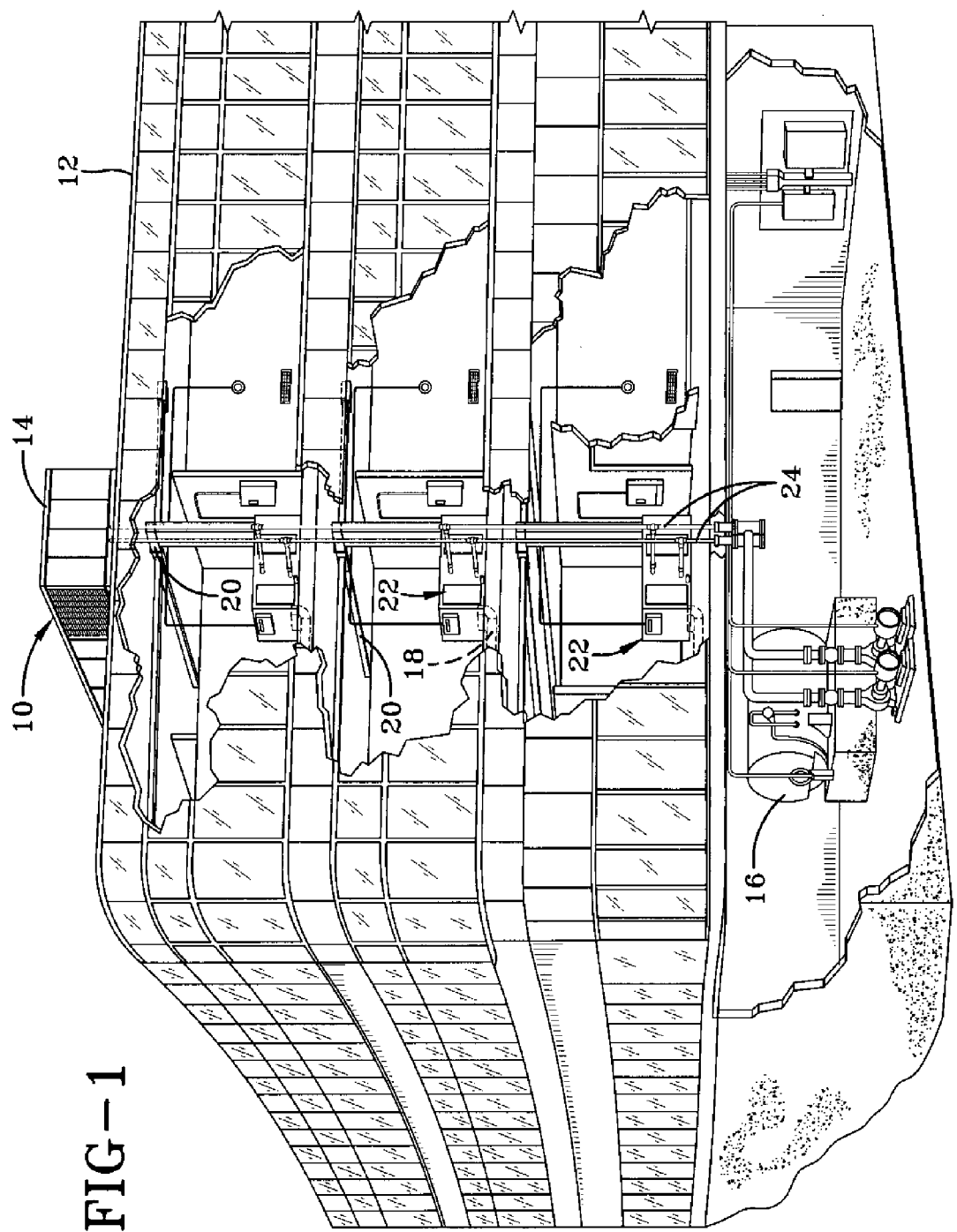
FIG. 1 shows an exemplary embodiment of a Heating, Ventilation, Air Conditioning and Refrigeration (HVAC&R) system in a commercial environment that may employ a VSD in accordance with the present application.

FIG. 1 shows an exemplary environment for a Heating, Ventilating, Air Conditioning system (HVAC system) 10 in a building 12 for a typical commercial setting. System 10 may include compressor incorporated into a chiller 14 that can supply a chilled liquid that may be used to cool building 12. System 10 can also include a boiler 16 to supply a heated liquid that may be used to heat building 12, and an air distribution system that circulates air through building 12. The air distribution system can include an air return duct 18, an air supply duct 20 and an air handler 22. Air handler 22 can include a heat exchanger that is connected to boiler 16 and chiller 14 by conduits 24. The heat exchanger in air handler 22 may receive either heated liquid from boiler 16 or chilled liquid from chiller 14 depending on the mode of operation of system 10. System 10 is shown with a separate air handler on each floor of building 12, but it will be appreciated that these components may be shared between or among floors.

Figure 2:
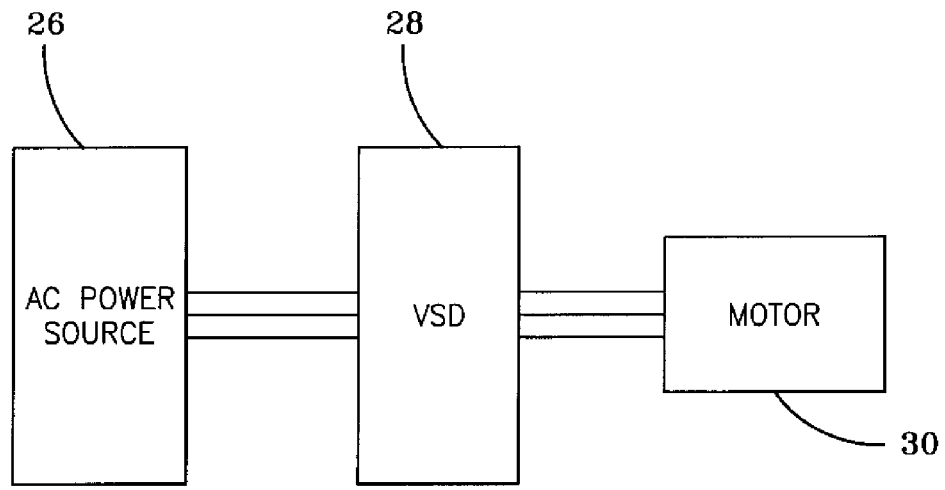
FIGS. 2 and 3 schematically illustrate a general system configuration that may employ a VSD in accordance with the present application.
Figure 3:
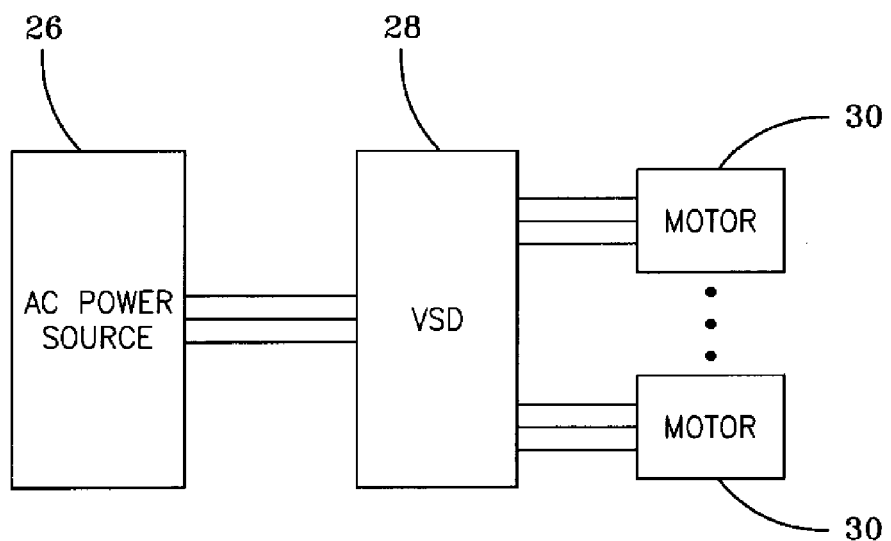

FIGS. 2 and 3 illustrate generally system configurations. An AC power source 26 supplies a variable speed drive (VSD) 28, which powers a motor 30 (see FIG. 2) or motors 30 (see FIG. 3). Motor(s) 30 is preferably used to drive a corresponding compressor of a refrigeration or chiller system (see generally, FIG. 3). AC power source 26 provides single phase or multi-phase (e.g., three phase), fixed voltage, and fixed frequency AC power to VSD 28 from an AC power grid or distribution system that is present at a site. AC power source 26 preferably can supply an AC voltage or line voltage of 200 V, 230 V, 380 V, 46 0 V, or 600 V, at a line frequency of 50 Hz or 60 Hz, to VSD 28 depending on the corresponding AC power grid.

VSD 28 receives AC power having a particular fixed line voltage and fixed line frequency from AC power source 26 and provides AC power to motor(s) 30 at a desired voltage and desired frequency, both of which can be varied to satisfy particular requirements. Preferably, VSD 28 can provide AC power to motor(s) 30 having higher voltages and frequencies and lower voltages and frequencies than the rated voltage and frequency of motor(s) 30. In another embodiment, VSD 28 may again provide higher and lower frequencies but only the same or lower voltages than the rated voltage and frequency of motor(s) 30. Motor(s) 30 is preferably an induction motor, but can include any type of motor that is capable of being operated at variable speeds. Motor 30 can have any suitable pole arrangement including two poles, four poles or six poles.

Figure 4:
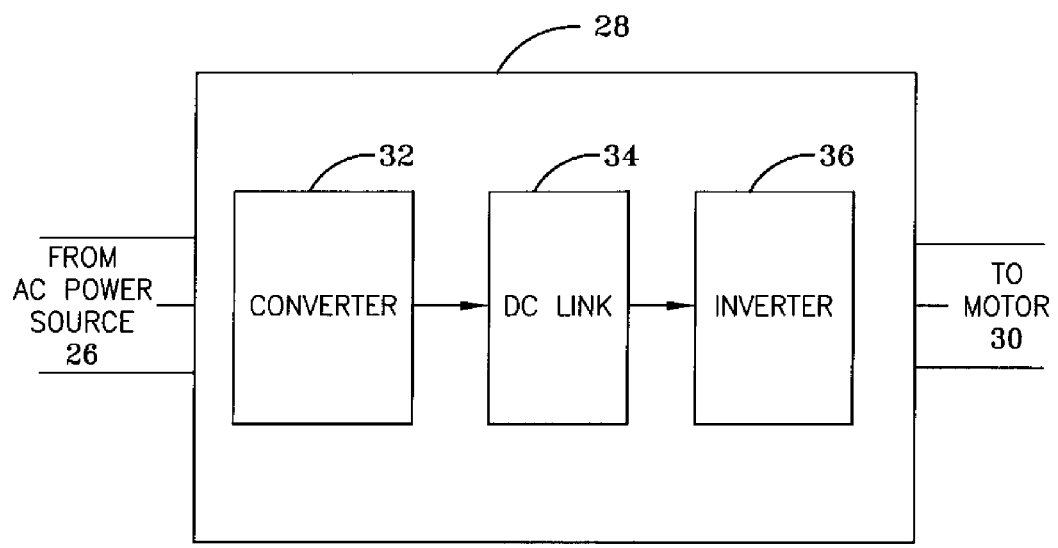
FIGS. 4 and 5 illustrate schematically embodiments of variable speed drives that may employ aspects of the present application.
Figure 5:
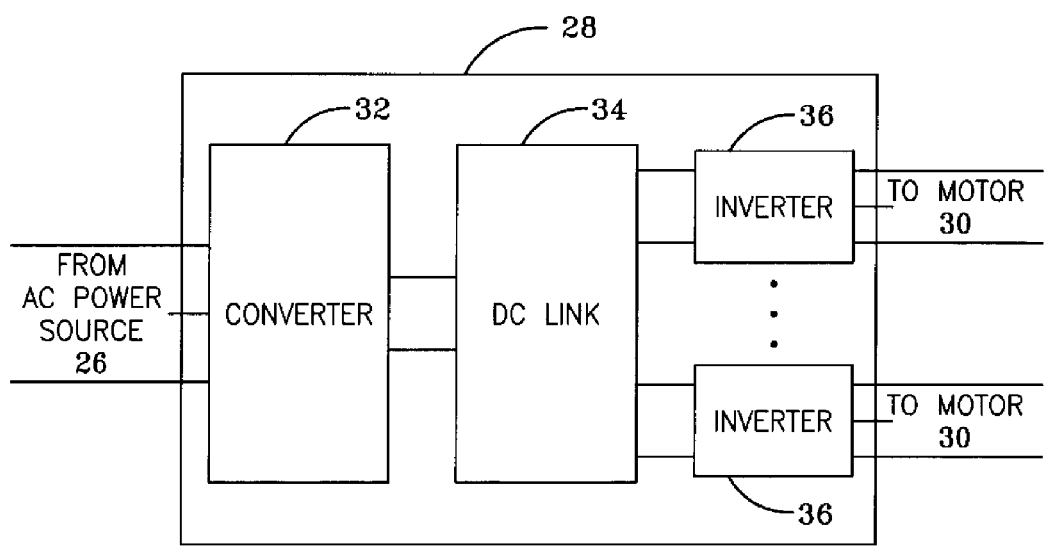

FIGS. 4 and 5 illustrate different embodiments of VSD 28. VSD 28 can have three stages: a converter stage 32, a DC link stage 34 and an output stage having one inverter 36 (see FIG. 4) or a plurality of inverters 36 (see FIG. 5). Converter 32 converts the fixed line frequency, fixed line voltage AC power from AC power source 26 into DC power. DC link 34 filters the DC power from converter 32 and provides energy storage components. DC link 34 can be composed of capacitors and inductors, which are passive devices that exhibit high reliability rates and very low failure rates. Finally, in the embodiment of FIG. 4, inverter 36 converts the DC power from DC link 34 into variable frequency, variable voltage AC power for motor 30 and, in the embodiment of FIG. 5, inverters 36 are connected in parallel on DC link 34 and each inverter 36 converts the DC power from DC link 34 into a variable frequency, variable voltage AC power for corresponding motor 30. Inverter(s) 36 can be a power module that can include power transistors, insulated gate bipolar transistor (IGBT) power switches and inverse diodes interconnected with wire bond technology. Furthermore, it is to be understood that the DC link 34 and inverter(s) 36 of VSD 28 can incorporate different components from those discussed above so long as DC link 34 and inverter(s) 36 of VSD 28 can provide motors 30 with appropriate output voltages and frequencies.

With regard to FIGS. 3 and 5, inverters 36 are jointly controlled by a control system such that each inverter 36 provides AC power at the same desired voltage and frequency to corresponding motors based on a common control signal or control instruction provided to each of inverters 36. In another embodiment, inverters 36 are individually controlled by a control system to permit each inverter 36 to provide AC power at different desired voltages and frequencies to corresponding motors 30 based on separate control signals or control instructions provided to each inverter 36. This capability permits inverters 36 of VSD 28 to more effectively satisfy motor 30 and system demands and loads independent of the requirements of other motors 30 and systems connected to other inverters 36. For example, one inverter 36 can be providing full power to motor 30, while another inverter 36 is providing half power to another motor 30. The control of inverters 36 in either embodiment can be by a control panel or other suitable control device.

For each motor 30 to be powered by VSD 28, there is a corresponding inverter 36 in the output stage of VSD 28. The number of motors 30 that can be powered by VSD 28 is dependent upon the number of inverters 36 that are incorporated into VSD 28. In one embodiment, there can be either 2 or 3 inverters 36 incorporated in VSD 28 that are connected in parallel to DC link 34 and used for powering a corresponding motor 30. While VSD 28 can have between 2 and 3 inverters 36, it is to be understood that more than 3 inverters 36 can be used so long as DC link 34 can provide and maintain the appropriate DC voltage to each of inverters 36.

Figure 6:
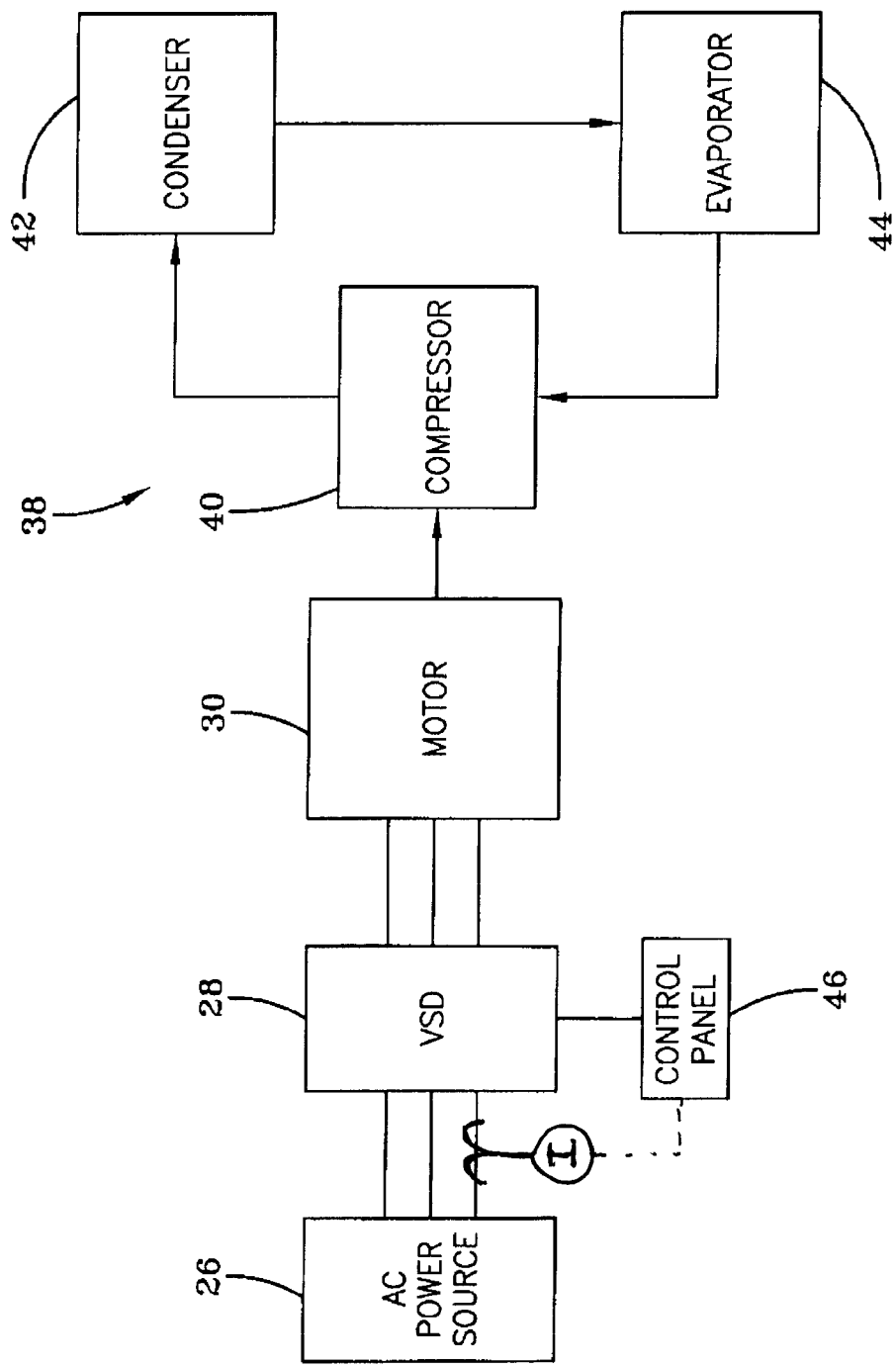
FIG. 6 illustrates schematically a refrigeration system that may employ a VSD in accordance with aspects of the present application.

FIG. 6 illustrates generally one embodiment of a refrigeration or chiller system using the system configuration and VSD 28 of FIGS. 2 and 4. As shown in FIG. 6, the HVAC, refrigeration or liquid chiller system 38 includes a compressor 40, a condenser arrangement 42, a liquid chiller or evaporator arrangement 44 and the control panel 46. Compressor 40 is driven by motor 30 that is powered by VSD 28. VSD 28 receives AC power having a particular fixed line voltage and fixed line frequency from AC power source 26 and provides AC power to motor 30 at desired voltages and desired frequencies, both of which can be varied to satisfy particular requirements. Control panel 46 can include a variety of different components such as an analog to digital (A/D) converter, a microprocessor, a non-volatile memory, and an interface board, to control operation of refrigeration system 38. Control panel 46 can also be used to control the operation of VSD 28, and motor 30.

Compressor 40 compresses a refrigerant vapor and delivers the vapor to condenser 42 through a discharge line. Compressor 40 can be any suitable type of compressor, e.g., screw compressor, centrifugal compressor, reciprocating compressor, scroll compressor, etc. The refrigerant vapor delivered by compressor 40 to condenser 42 enters into a heat exchange relationship with a fluid, e.g., air or water, and undergoes a phase change to a refrigerant liquid as a result of the heat exchange relationship with the fluid. The condensed liquid refrigerant from condenser 42 flows through an expansion device (not shown) to evaporator 44.

Evaporator 44 can include connections for a supply line and a return line of a cooling load. A secondary liquid, e.g., water, ethylene, calcium chloride brine or sodium chloride brine, travels into evaporator 44 via return line and exits evaporator 44 via supply line. The liquid refrigerant in evaporator 44 enters into a heat exchange relationship with the secondary liquid to lower the temperature of the secondary liquid. The refrigerant liquid in evaporator 44 undergoes a phase change to a refrigerant vapor as a result of the heat exchange relationship with the secondary liquid. The vapor refrigerant in evaporator 44 exits the evaporator 44 and returns to compressor 40 by a suction line to complete the cycle. It is to be understood that any suitable configuration of condenser 42 and evaporator 44 can be used in system 38, provided that the appropriate phase change of the refrigerant in condenser 42 and evaporator 44 is obtained.

HVAC, refrigeration or liquid chiller system 38 can include many other features that are not shown in FIG. 3. These features have been purposely omitted to simplify the drawing for ease of illustration. Furthermore, while FIG. 6 illustrates HVAC, refrigeration or liquid chiller system 38 as having one compressor connected in a single refrigerant circuit, it is to be understood that system 38 can have multiple compressors, powered by a single VSD as shown in FIGS. 3 and 5 or multiple VSDs, see generally, the embodiment shown in FIGS. 2 and 4, connected into each of one or more refrigerant circuits.

Figure 7:
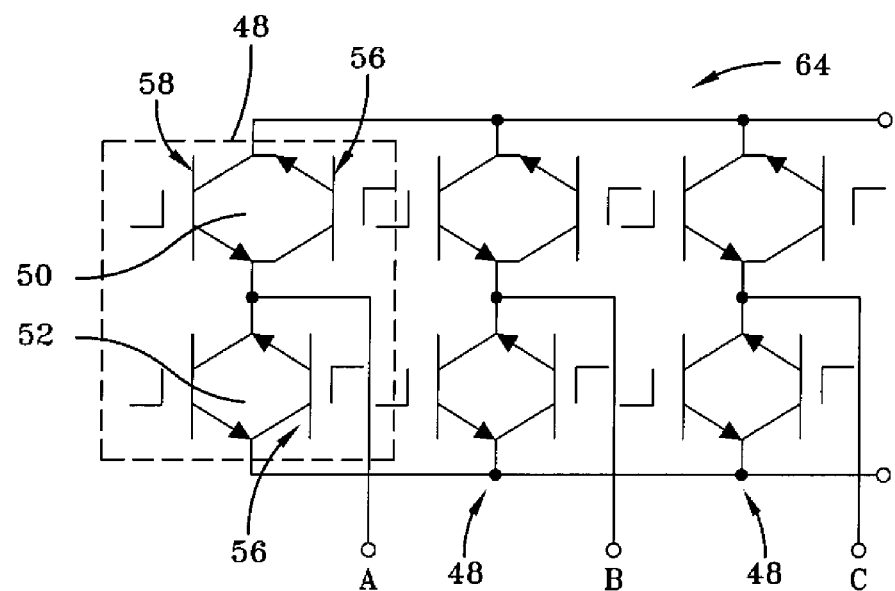
FIG. 7 is an inverse parallel connection of two reverse-blocking IGBTs.

Referring to FIG. 7, a reverse-blocking (RB) IGBT dual module 48 is used in each of the phases A, B and C, of three-phase converter 32. Each RB IGBT dual module 48 is formed by the inverse parallel connection of two reverse-blocking IGBTs, in upper and lower switches, 50 and 52, respectively. Each RB IGBT dual module 48 is controllable to extinguish a ground fault. A diode 54 (see, e.g., FIG. 8) which normally provides a half wave conduction path around conventional IGBTs has been replaced with an anti-parallel RB IGBT 56. In order to ensure a complete disconnect of VSD 28 from motor load 30, bi-directional current flow must be extinguished in both the upper and lower portions 50, 52, of all three legs—A, B and C—of active converter 32. While one phase leg of the active converter ground fault protection is described, it will be understood by those persons skilled in the art that each phase of the active converter operates in the same manner for multi-phase, e.g., three-phase—AC power systems.

Each of the upper and lower switches 50 and 52 is comprised of two RB IGBTs 58, 56. An RB IGBT is capable of blocking voltages in the reverse as well as the forward direction. A first RB IGBT 58 is connected to an inverse or anti-parallel IGBT 56. Anti-parallel IGBT 56 is also an RB-type IGBT. Anti-parallel IGBT 56 can be controlled, e.g., during a precharge operation of DC link 34, to permit only small pulses of inrush current to reach DC link 34. Further, anti-parallel IGBT 56 can be controlled to conduct current in one direction at all times, similar to anti-parallel diode 54. RB IGBT 58 blocks a positive emitter-to-collector voltage that is approximately equal to the peak line-to-line voltage that appears across IGBT 58. The positive emitter-to-collector voltage remains blocked for as long as the conduction of anti-parallel IGBT 56 is delayed for the purpose of precharge. Commonly assigned U.S. Pat. No. 7,005,829 and U.S. Published Pat. App. No. 20060208685, No. 20060196203 & No. 20050122752, disclose various means to implement an active converter module to allow for precharging the DC link of a VSD or a parallel active harmonic filter, and the same are hereby incorporated by reference herein.

When a ground fault current is sensed by the VSD 28, both RB IGBTs 58, 56, in each power switch 48 are immediately turned off to preventing any current from conducting to the ground fault. The rapid switching of RB IGBTs 58, 56 extinguishes the ground fault current in microseconds. By contrast, prior art circuit breaker mechanisms take approximately 40 milliseconds to interrupt the ground fault current.

Figure 8:
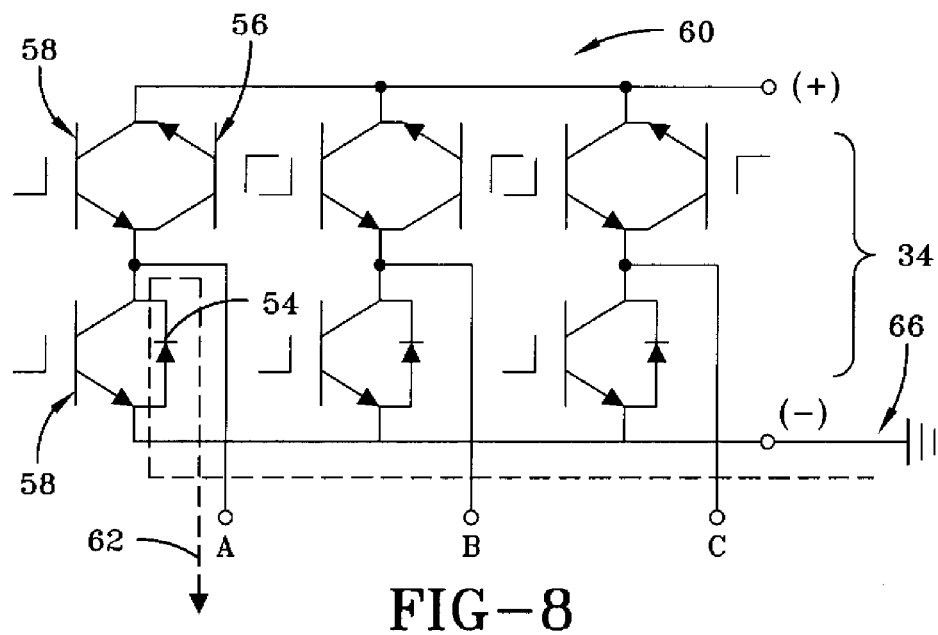
FIG. 8 is a prior art conventional 3-phase active converter module.

Referring next to FIG. 8, a 3-phase active converter module 60, incorporated for pre-charge means, includes first RB IGBT 58 connected to inverse or anti-parallel diode 54. The negative leg of DC link 34 indicates a ground fault condition 66. If all of IGBTs 58 are gated off, a current path 62 exists, as shown by broken line and arrow, when the input voltage to the active converter is forward biased across diode 54. Since conventional diode 54 does not include a gate control for controlling current flow, the fault circuit is complete. Converter module 60 also includes the corresponding control connections (not shown for simplicity) to control the switching of the power switches in a manner similar to that described above for the inverter module. As can be seen by comparing the circuit in FIG. 8 with the circuit shown in FIG. 7, active converter 64 shown in FIG. 7 has a controllable RB IGBT 56 connected in anti-parallel with RB IGBT 58, rather than anti-parallel connected diode 54. RB IGBT 56 enables active converter 60 to essentially instantaneously open the faulted circuit and extinguish the ground fault current, i.e., within microseconds. Thus, the amount of time that the system components are exposed to damaging fault current levels is comparatively minimal.

Active converter 32 ground fault protection eliminates the need for an input circuit breaker equipped with ground fault protection, or with other electro-mechanical means to process the input power. Active converter 64 configuration allows for the use of power fuses rather than more costly circuit breakers to feed the power to the input converter of a VSD, while retaining the ground fault protection feature. Fuses provide a significant reduction in the let-thru energy associated with a line-to-line fault that may occur within the VSD or filter, thereby reducing instances of the semi-conductor package rupture, or of other significant damage incurred in the case of a fault. By utilizing high speed fuses for the power feed, the arc-flash rating of the equipment (see, e.g., the National Fire and Protection Agency (NFPA) regulation 70E) can be significantly reduced. The high-speed fuses reduce the hazard associated with installing, maintaining and repairing the system. By replacing main circuit breakers with fuses at the input of the active converter, the system can interrupt higher levels of fault current, thus enabling the use of fused-input equipment on much lower impedance mains supplies. Active converter 64 significantly reduces the energy associated with clearing the ground fault, because semiconductors and controls can detect and extinguish the ground current flow in several microseconds, as contrasted with several tens of milliseconds for conventional topologies. The rapid response of the fuses minimizes ancillary damage associated with a ground fault. This advantage may be particularly apparent when used in HVAC&R applications where hermetic motors are employed. A ground fault occurring in the stator winding of a hermetic motor can cause significant and costly damage to the entire refrigeration circuit. Limiting the ground fault current that can flow in the stator limits collateral damage to other components of the HVAC&R system.

While only certain features and embodiments of the invention have been illustrated and described, many modifications and changes may occur to those skilled in the art (For example, variations in sizes, dimensions, structures, shapes and proportions of the various elements, values of parameters (For example, temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (For example, those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A variable speed drive system configured to receive an input AC voltage at a fixed AC input voltage and provide an output AC power at a variable voltage and variable frequency, the variable speed drive comprising:
   a converter stage comprising at least two semiconductor switches for each power phase of the AC power source, the converter stage connected to an AC power source providing the input AC voltage, the converter stage being configured to convert the input AC voltage to a boosted DC voltage;
   a DC link connected to the converter stage, the DC link being configured to filter and store the boosted DC voltage from the converter stage;
   an inverter stage connected to the DC link, the inverter stage being configured to convert the boosted DC voltage from the DC link into the output AC power having the variable voltage and the variable frequency; and a controller for interrupting fault current flowing to an input phase of the converter stage in response to at least one current sensor sensing a ground fault on an input of the converter stage wherein each of the at least two semiconductor switches comprising a pair of reverse blocking (RB) IGBTs inversely connected in parallel.

2. The VSD of claim 1, wherein each of the reverse blocking IGBTs is controllable by the controller to switch the RB IGBTs to a nonconductive state in response to a sensed ground fault current.

3. The VSD of claim 2, wherein each RB IGBT switch is formed by an inverse parallel connection of the pair of the reverse-blocking IGBTs, in the at least two semiconductor switches.

4. The VSD of claim 1, wherein each of the RB IGBTs is controllable by the controller to completely extinguishing a ground fault current.

5. The VSD of claim 3, wherein the controller is configured to extinguish bi-directional current flow in a first semiconductor switch and a second semiconductor switch, for three legs of the converter stage, to ensure a complete disconnect of the VSD from a motor load connected to an output of the VSD.

6. The VSD of claim 2, wherein one RB IGBT of the pair of RB IGBTs of each semiconductor switch is controlled to permit only small pulses of inrush current to reach the DC link.

7. The VSD of claim 6, wherein the RB IGBTs of each semiconductor switch is controlled to conduct the small pulses of inrush current to reach the DC link during a precharge operation of the DC link.

8. The VSD of claim 2, wherein at least one RB IGBT of the pair of RB IGBTs in each semiconductor switch of the pair of semiconductor switches can be controlled to conduct current in one direction at all times.

9. A chiller system comprising:
a refrigerant circuit comprising a compressor, a condenser arrangement and an evaporator arrangement connected in a closed loop;
a drive arrangement connected to the compressor to power the compressor, the drive arrangement comprising a motor and a variable speed drive, the variable speed drive comprising:
a converter stage comprising at least two semiconductor switches for each power phase of the AC power source, the converter stage connected to an AC power source providing the input AC voltage, the converter stage being configured to convert the input AC voltage to a boosted DC voltage;
a DC link connected to the converter stage, the DC link being configured to filter and store the boosted DC voltage from the converter stage;
an inverter stage connected to the DC link, the inverter stage being configured to convert the boosted DC voltage from the DC link into the output AC power having the variable voltage and the variable frequency;
a controller for interrupting fault current flowing to an input phase of the converter stage in response to at least one current sensor sensing a ground fault on an input of the converter stage wherein each of the at least two semiconductor switches comprising a pair of reverse blocking (RB) IGBTs inversely connected in parallel.

10. The chiller system of claim 9, wherein each of the reverse blocking IGBTs is controllable by the controller to switch the RB IGBTs to a nonconductive state in response to a sensed ground fault current.

11. The chiller system of claim 10, wherein each RB IGBT switch is formed by an inverse parallel connection of the pair of the reverse-blocking IGBTs, in the at least two semiconductor switches.

12. The chiller system of claim 9, wherein each of the RB IGBTs is controllable by the controller to completely extinguishing a ground fault current.

13. The chiller system of claim 11, wherein the controller is configured to extinguish bi-directional current flow in a first semiconductor switch and a second semiconductor switch, for three legs of the converter stage, to ensure a complete disconnect of the chiller system from a motor load connected to an output of the chiller system.

14. The chiller system of claim 10, wherein one RB IGBT of the pair of RB IGBTs of each semiconductor switch is controlled to permit only small pulses of inrush current to reach the DC link.

15. The chiller system of claim 14, wherein the RB IGBTs of each semiconductor switch is controlled to conduct the small pulses of inrush current to reach the DC link during a precharge operation of the DC link.

16. The chiller system of claim 10, wherein at least one RB IGBT of the pair of RB IGBTs in each semiconductor switch of the pair of semiconductor switches can be controlled to conduct current in one direction at all times.

* * * * *